(12) United States Patent
Lin et al.

(10) Patent No.: US 9,787,115 B2
(45) Date of Patent: Oct. 10, 2017

(54) UNIVERSAL SERIAL BUS ADAPTOR AND UNIVERSAL SERIAL BUS CABLE

(71) Applicant: HON HAI PRECISION INDUSTRY CO., LTD., New Taipei (TW)

(72) Inventors: Yi-Chuan Lin, New Taipei (TW); Yu-Hu Yan, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 275 days.

(21) Appl. No.: 14/486,472

(22) Filed: Sep. 15, 2014

(65) Prior Publication Data

US 2015/0303724 A1    Oct. 22, 2015

(30) Foreign Application Priority Data

Apr. 21, 2014    (TW) .............................. 103114330 A (51) Int. Cl.
| | |
|---|---|
| H02J 7/00 | (2006.01) |
| H01R 4/66 | (2006.01) |
| H01R 24/00 | (2011.01) |
| H01R 24/62 | (2011.01) |
| H01R 31/06 | (2006.01) |
| H01R 31/08 | (2006.01) |

(52) U.S. Cl.
CPC ............ *H02J 7/0052* (2013.01); *H02J 7/007* (2013.01); *H01R 24/62* (2013.01); *H01R 31/06* (2013.01);

(Continued)

(58) Field of Classification Search
CPC . Y02E 60/12; H02J 7/14; H02J 7/0068; H02J 7/0052; H02J 7/007;

(Continued)

(56) References Cited

U.S. PATENT DOCUMENTS 8,237,414 B1 *   8/2012   Li ......................... H02J 7/0003
                                                     320/103
8,458,376 B1 *   6/2013   Chen ...................... G06F 1/266
                                                     710/15

(Continued)

FOREIGN PATENT DOCUMENTS

| CN | 101359836 A | 2/2009 |
|---|---|---|
| CN | 201282176   | 7/2009 |

(Continued)

*Primary Examiner* — Richard Isla Rodas
*Assistant Examiner* — Mohammed J Sharief
(74) *Attorney, Agent, or Firm* — Steven Reiss (57) ABSTRACT

A universal serial bus (USB) adaptor supplies a large charging current to charge a device. The USB adaptor includes a voltage conversion circuit, a USB interface, a current detection circuit, a first switch, a second switch, and a third switch. The USB interface includes a power pin, a first data pin, a second data pin, and a ground pin. The current detection circuit detects a charging current of the device, and converts the charging current into a voltage to compare the charging current with a reference voltage to output a comparison signal. The first switch, the second switch, and the third switch control connection relationships between the power pin and the first data pin, the first data pin and the second data pin, and the second data pin and the ground pin according to the comparison signal, respectively. A USB cable is also provided.

10 Claims, 4 Drawing Sheets

(52) U.S. Cl.
CPC ....... *H01R 31/08* (2013.01); *H02J 2007/0062* (2013.01)

(58) Field of Classification Search
CPC .. H02J 2007/0062; H02J 7/022; H02J 7/0093; H02J 2007/0059; H01M 10/44; H01M 10/441; H01R 24/62; H01R 31/06; H01R 31/08; H01R 23/7073; H01R 23/02; H01R 23/725; H01R 13/26; H01R 13/658; H01R 23/688; H01R 23/6873; H01R 13/65802; H01R 23/005
USPC .................. 320/137, 140, 162; 439/108, 660
See application file for complete search history.

(56) References Cited

U.S. PATENT DOCUMENTS

| | | |
|---|---|---|
| 2005/0228934 A1 | 10/2005 | Tsutsui |
| 2008/0224658 A1* | 9/2008 | Borjeson ............... G06F 13/385 320/114 |
| 2009/0267569 A1* | 10/2009 | Bayne ....................... G06F 1/26 320/137 |
| 2011/0043162 A1 | 2/2011 | Lee et al. |
| 2011/0095722 A1 | 4/2011 | Chang |
| 2012/0210146 A1 | 8/2012 | Lai et al. |
| 2013/0080797 A1 | 3/2013 | Chen |
| 2013/0175977 A1 | 7/2013 | Tinaphong et al. |

FOREIGN PATENT DOCUMENTS

| | | | | |
|---|---|---|---|---|
| CN | 101627348 A | | 1/2010 | |
| CN | 103178583 A | | 6/2013 | |
| CN | 103208661 | | 7/2013 | |
| KR | 20150001194 A | * | 1/2015 | ............... H02J 7/04 |
| TW | M422230 | | 2/2012 | |
| TW | M469678 U | | 1/2014 | |

* cited by examiner

UNIVERSAL SERIAL BUS ADAPTOR AND UNIVERSAL SERIAL BUS CABLE

FIELD

The disclosure relates to universal serial bus (USB) adaptors, and particularly to a USB adaptor that can supply a large charging current.

BACKGROUND

A USB charger includes a USB adaptor and a USB cable, and the USB adaptor and the USB cable both include a USB connector. When an electronic device is being charged, a first terminal of the USB cable is connected to the USB adaptor, and a second terminal of the USB cable is connected to the electronic device.

BRIEF DESCRIPTION OF THE DRAWINGS

Implementations of the present technology will now be described, by way of example only, with reference to the attached figures, wherein.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

The present disclosure is described in relation a USB adaptor.

Figure 1:
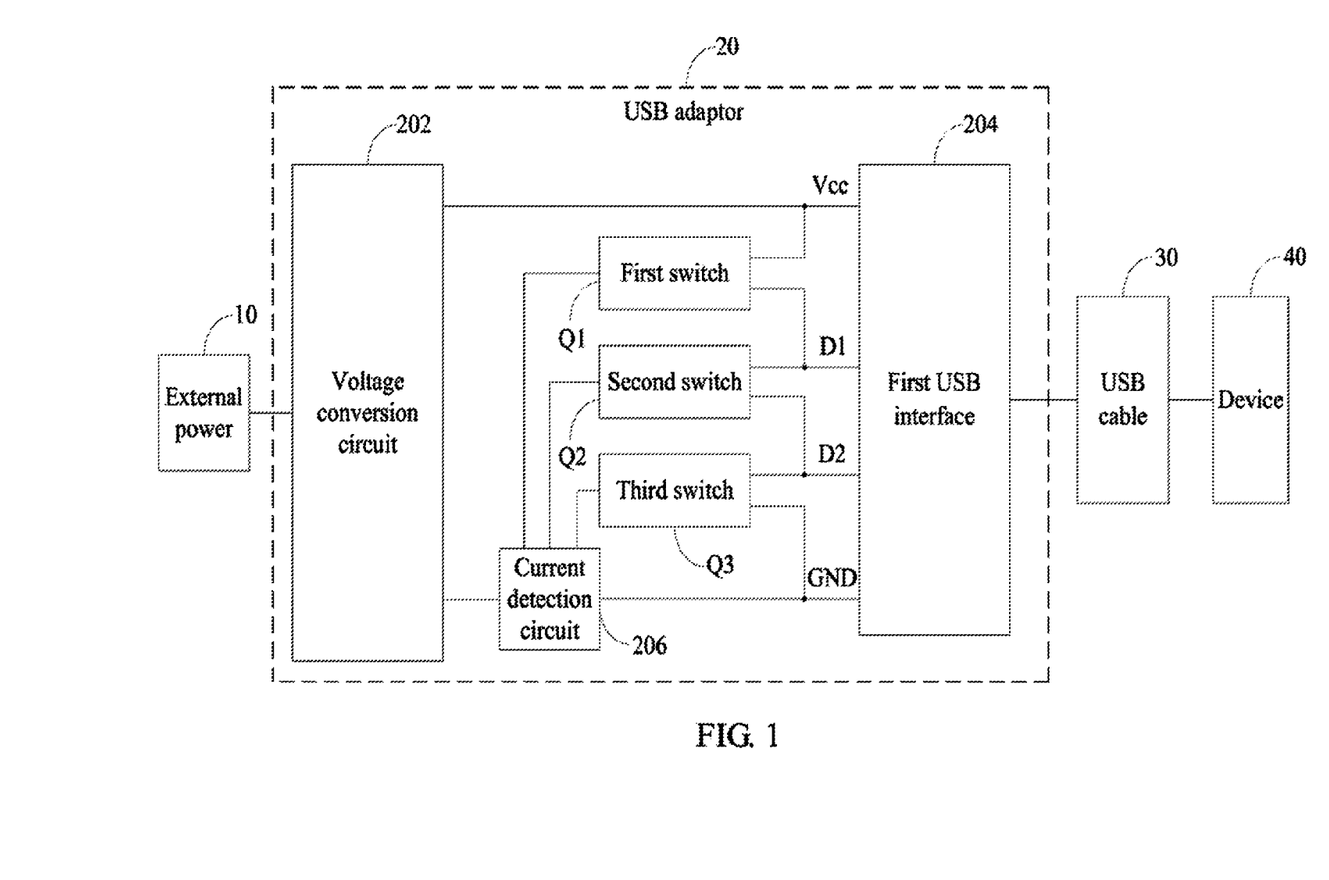
FIG. 1 is a schematic diagram of a first embodiment of a USB adaptor.

FIG. 1 illustrates a schematic diagram of a first embodiment of a universal serial bus (USB) adaptor 20. In one embodiment, the USB adaptor 20 receives voltage signals from an external power 10, and converts the received voltage signals to charge a device 40 via a USB cable 30. The USB adaptor 20 comprises a voltage conversion circuit 202, a first USB interface 204, a current detection circuit 206, a first switch Q1, a second switch Q2, and a third switch Q3. The voltage conversion circuit 202 converts the voltage signals output by the external power 10. The first USB interface 204 comprises a power pin VCC, a first data pin D1, a second data pin D2, and a ground pin GND, and the power pin VCC of the first USB interface 204 is connected to the voltage conversion circuit 202. The current detection circuit 206 is connected to the voltage conversion circuit 202 and the ground pin GND of the first USB interface 204. The current detection circuit 206 detects a charging current of the device 40, and compares the charging current of the device 40 with a reference voltage Vref to output a comparison signal.

In one embodiment, the voltage signals output by the external power 10 can be alternating current (AC) voltage signals or DC voltage signals. The voltage conversion circuit 202 converts the voltage signals output by the external power 10 to output DC electrical signals. A voltage value of the electrical signals is 5V, and a current value of the electrical signals is 3 A so that a maximum charging current of the device 40 is 3 A. The USB cable 30 can transmit 3 A charging current, and the device 40 can have different charging states and can automatically adjust the charging current in a device, for example a matching mobile phone.

The first switch Q1 is connected to the current detection circuit 206, the power pin VCC of the first USB interface 204, and the first data pin D1 of the first USB interface 204. The first switch Q1 controls a connection relationship between the power pin VCC of the first USB interface 204 and the first data pin D1 of the first USB interface 204 according to the comparison signal output by the current detection circuit 206. The second switch Q2 is connected to the current detection circuit 206, the first data pin D1 of the first USB interface 204, and the second data pin D2 of the first USB interface 204. The second switch Q2 controls a connection relationship between the first data pin D1 of the first USB interface 204 and the second data pin D2 of the first USB interface 204 according to the comparison signal output by the current detection circuit 206. The third switch Q3 is connected to the current detection circuit 206, the second data pin D2 of the first USB interface 204, and the ground pin GND of the first USB interface 204. The third switch Q3 controls a connection relationship between the second data pin D2 of the first USB interface 204 and the ground pin GND of the first USB interface 204 according to the comparison signal output by the current detection circuit 206.

In one embodiment, a value of a transmitting current of the power pin VCC, the first data pin D1, the second data pin D2, or the ground pin GND of the first USB interface 204 is no greater than 2 A because of a pin size of the first USB interface 204 is fixed in current technology.

In one embodiment, the current detection circuit 206 converts the charging current of the device 40 into a voltage via a known module, for example, a resistor, to compare the charging current with the reference voltage Vref to output the comparison signal. The reference voltage Vref corresponds to 2 A charging current. That is, when the charging current of the device 40 is greater than the reference voltage Vref, the charging current of the device 40 is greater than 2 A.

When the current detection circuit 206 detects the charging current of the device 40 is greater than the reference voltage Vref, the current detection circuit 206 outputs a first comparison signal. The first switch Q1 controls the power pin VCC of the first USB interface 204 connected to the first data pin D1 of the first USB interface 204 according to the first comparison signal so that the power pin VCC and the first data pin D1 of the first USB interface 204 can transmit a parallel charging current. The second switch Q2 controls the first data pin D1 of the first USB interface 204 not connected to the second data pin D2 of the first USB interface 204 according to the first comparison signal. The third switch Q3 controls the second data pin D2 of the first USB interface 204 connected to the ground pin GND of the first USB interface 204 according to the first comparison signal so that the second data pin D2 and the ground pin GND of the first USB interface 204 can transmit the parallel charging current. When the charging current is greater than 2 A, the connection relationships between the power pin VCC and the first data pin D1 of the first USB interface 204, and the second data pin D2 and the ground pin GND of the first USB interface 204 are changed into a parallel connection via the first switch Q1, the second switch Q2, and the third switch Q3, to improve a transmission current ability of the first USB interface 204. Therefore, the first USB interface 204 can transmit the charging current that is greater than 2 A to charge the device 40.

In one embodiment, the current detection circuit 206 is connected to the voltage conversion circuit 202 and the ground pin GND of the first USB interface 204 to detect the charging current of the device 40. In other embodiments, the current detection circuit 206 can be connected to the voltage conversion circuit 202 and the power pin VCC of the first USB interface 204 to detect the charging current of the device 40.

Figure 2:
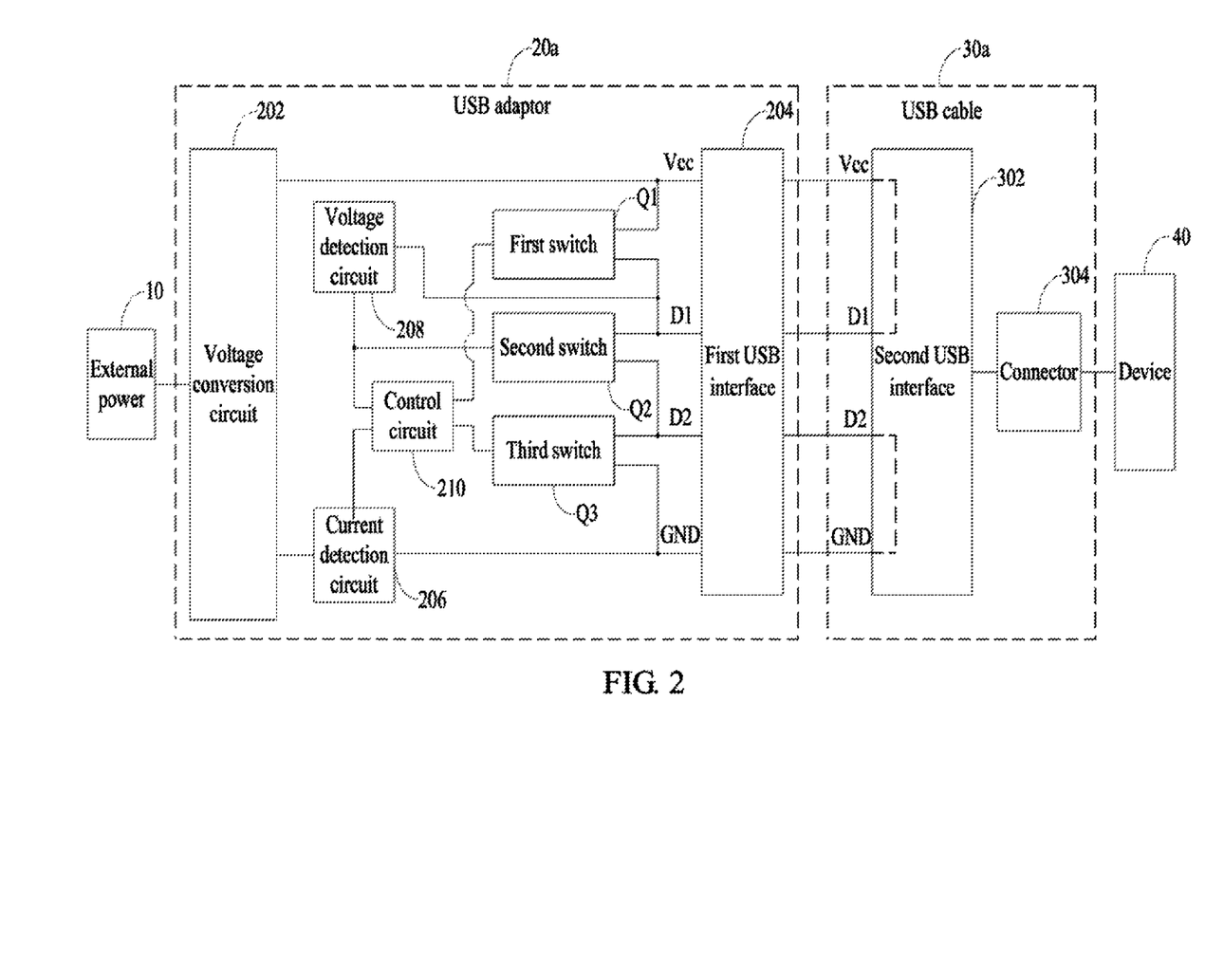
FIG. 2 is a schematic diagram of a second embodiment of a USB adaptor.

FIG. 2 illustrates a schematic diagram of a second embodiment of a USB adaptor 20a. In one embodiment, the USB adaptor 20a receives the voltage signals from the external power 10, and converts the received voltage signals to charge the device 40 via a USB cable 30a. The USB adaptor 20a is similar to the USB adaptor 20 of the first embodiment, the difference between the USB adaptor 20a and the USB adaptor 20 is that the USB adaptor 20a further comprises a voltage detection circuit 208 and a control circuit 210.

The USB cable 30a comprises a second USB interface 302 and a connector 304. The second USB interface 302 also comprises the power pin VCC, the first data pin D1, the second data pin D2, and the ground pin GND. The first USB interface 204 and the second USB interface 302 can be connected together, or can be disconnected from each other. When the first USB interface 204 and the second USB interface 302 are connected together, the power pin VCC, the first data pin D1, the second data pin D2, and the ground pin GND of the first USB interface 204 are connected to the power pin VCC, the first data pin D1, the second data pin D2, and the ground pin GND of the second USB interface 302, respectively.

In one embodiment, the connector 304 can be plugged into the device 40. The first USB interface 204 and the second USB interface 302 can be in the form of mating USB connectors, and the connector 304 can be a round hole plug, or other suitable types of matching physical interfaces.

Figure 3:
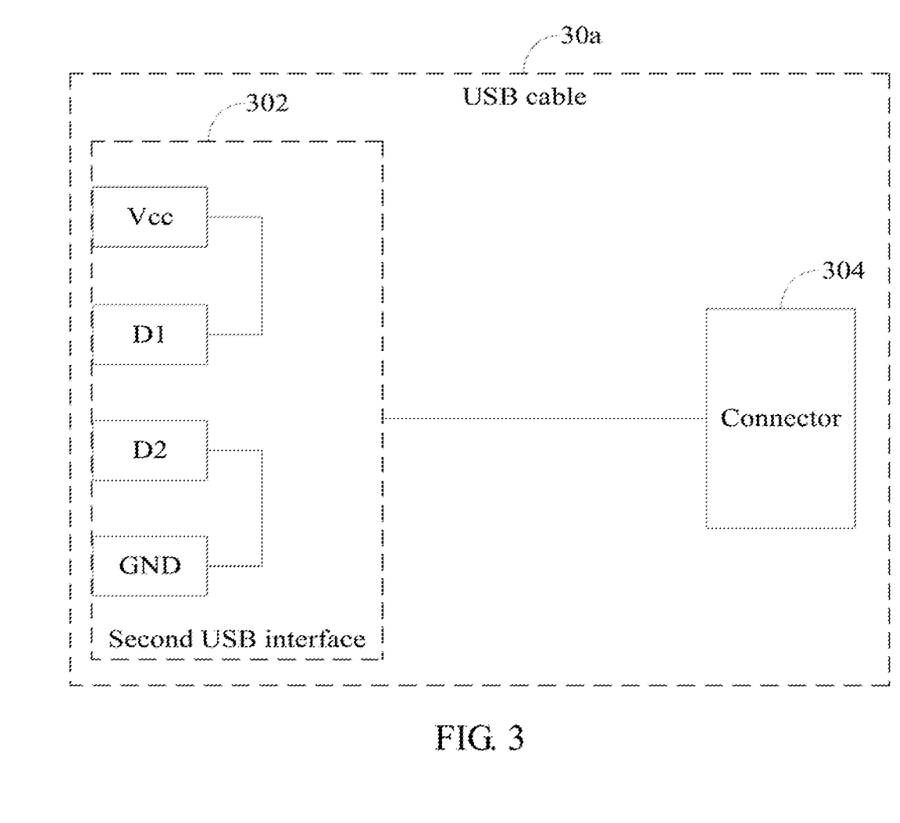
FIG. 3 is a schematic diagram of a first embodiment of a USB cable.

In one embodiment, the USB cable 30a is a special USB cable, the USB cable 30a is similar to a universal USB cable that already exists in current technology, the difference between the USB cable 30a and the universal USB cable is that the power pin VCC of the second USB interface 302 is connected to the first data pin D1 of the second USB interface 302, and the second data pin D2 of the second USB interface 302 is connected to the ground pin GND of the second USB interface 302. FIG. 3 illustrates a schematic diagram of a first embodiment of the USB cable 30a. The USB cable 30a can transmit the charging current that is greater than 2 A because of the power pin VCC and the first data pin D1 of the second USB interface 302 transmit the parallel charging current, and the second data pin D2 and the ground pin GND of the second USB interface 302 transmit the parallel charging current. In other embodiments, when the charging current is no greater than 2 A, the USB cable 30a can be instead a universal USB cable that already exists in current technology.

In one embodiment, when the USB cable 30a is the universal USB cable, each of pins of the second USB interface 302 is not connected to each other.

The voltage detection circuit 208 is connected to the first data pin D1 of the first USB interface 204. The voltage detection circuit 208 detects and determines whether a DC voltage exists at the first data pin D1 of the first USB interface 204 or not, to identify the type of the USB cable 30a. The voltage detection circuit 208 outputs a first control signal in response to the DC voltage not existing at the first data pin D1 of the first USB interface 204, and outputs a second control signal in response to the DC voltage existing at the first data pin D1 of the first USB interface 204. The first switch Q1 controls the power pin VCC of the first USB interface 204 not connected to the first data pin D1 of the first USB interface 204 according to the first control signal. The second switch Q2 controls the first data pin D1 of the first USB interface 204 connected to the second data pin D2 of the first USB interface 204 according to the first control signal. In addition, the third switch Q3 controls the second data pin D2 of the first USB interface 204 not connected to the ground pin GND of the first USB interface 204 according to the first control signal. Therefore, the maximum charging current of the device 40 is 2 A at most.

In one embodiment, when the device 40 is charging and the USB cable 30a is the universal USB cable, the voltage detection circuit 208 detects the DC voltage does not exist at the first data pin D1 of the first USB interface 204 because the power pin VCC of the second USB interface 302 is not connected to the first data pin D1 of the second USB interface 302, and the maximum charging current of the device 40 is 2 A at most. When the USB cable 30a is the special USB cable, the voltage detection circuit 208 detects the DC voltage exists at the first data pin D1 of the first USB interface 204 because the power pin VCC of the second USB interface 302 is connected to the first data pin D1 of the second USB interface 302, and the maximum charging current of the device 40 is 3 A at most.

The control circuit 210 is connected to the current detection circuit 206, the voltage detection circuit 208, the first switch Q1, and the third switch Q3. The voltage detection circuit 208 is connected to the second switch Q2. When the DC voltage exists at the first data pin D1 of the first USB interface 204, the voltage detection circuit 208 outputs the second control signal, and the USB cable 30a is the special USB cable. The current detection circuit 206 determines if the charging current of the device 40 is greater than 2 A. In addition, the current detection circuit 206 outputs the first comparison signal in response to the charging current of the device 40 being greater than 2 A. The control circuit 210 outputs a third control signal according to the first comparison signal output by the current detection circuit 206 and the second control signal output by the voltage detection circuit 208. The first switch Q1 controls the power pin VCC of the first USB interface 204 connected to the first data pin D1 of the first USB interface 204 according to the third control signal, the second switch Q2 controls the first data pin D1 of the first USB interface 204 not connected to the second data pin D2 of the first USB interface 204 according to the second control signal, and the third switch Q3 controls the second data pin D2 of the first USB interface 204 connected to the ground pin GND of the first USB interface 204 according to the third control signal. Therefore, the first USB interface 204 can transmit the charging current that is greater than 2 A.

When the charging current of the device 40 is no greater than 2 A, the current detection circuit 206 outputs the second comparison signal. The control circuit 210 outputs a fourth control signal according to the second comparison signal output by the current detection circuit 206 and the second control signal output by the voltage detection circuit 208. The first switch Q1 controls the power pin VCC of the first USB interface 204 not connected to the first data pin D1 of the first USB interface 204 according to the fourth control signal. The second switch Q2 controls the first data pin D1 of the first USB interface 204 not connected to the second data pin D2 of the first USB interface 204 according to the second control signal. In addition, the third switch Q3 controls the second data pin D2 of the first USB interface 204 not connected to the ground pin GND of the first USB interface 204 according to the fourth control signal. The USB adaptor 20a determines whether the connected USB cable 30a can transmit the charging current that is greater than 2 A or not via the voltage detection circuit 208. When the USB cable 30a can transmit the charging current that is greater than 2 A, the USB adaptor 20a further determines whether the charging current is greater than 2 A or not via the current detection circuit 206, changing the connection relationships between the power pin VCC of the first USB interface 204 and the first data pin D1 of the first USB interface 204, and changing the connection relationships between the second data pin D2 of the first USB interface 204 and the ground pin GND of the first USB interface 204.

In one embodiment, the voltage detection circuit 208 can also be connected to the second data pin D2 of the first USB interface 204, and the voltage detection circuit 208 detects and determines whether the DC voltage exists at the second data pin D2 of the first USB interface 204 or not, to identify the type of the USB cable 30a.

Figure 4:
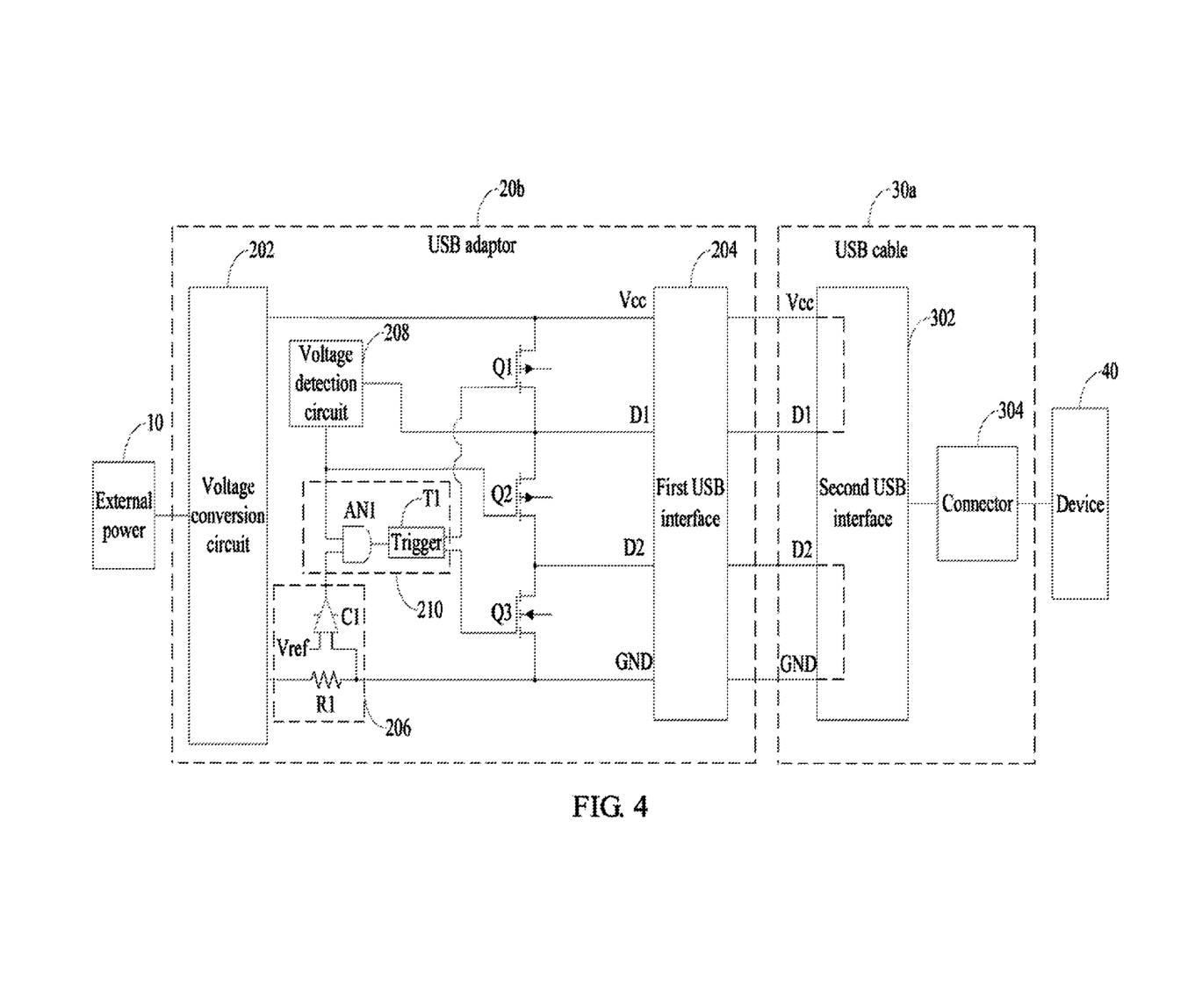
FIG. 4 is a circuit diagram of a third embodiment of a USB adaptor.

FIG. 4 illustrates a circuit diagram of a third embodiment of a USB adaptor 20b. In one embodiment, the current detection circuit 206 comprises a sampling resistor R1 and a comparator C1. A first end of the sampling resistor R1 is connected to the voltage conversion circuit 202, and a second end of the sampling resistor R1 is connected to the ground pin GND of the first USB interface 204. The comparator C1 comprises a positive input terminal, a negative input terminal, and an output terminal. The positive input terminal of the comparator C1 is connected to a node between the sampling resistor R1 and the ground pin GND of the first USB interface 204, the negative input terminal of the comparator C1 receives the reference voltage Vref, and the output terminal of the comparator C1 is connected to the control circuit 210. The current detection circuit 206 can also be other modules that detect the charging current of the device 40.

The voltage detection circuit 208 can be a known detection module that detects DC voltage, i.e., voltage detection modules that already exist in current technology.

The control circuit 210 comprises a AND gate AN1 and a trigger T1. The AND gate AN1 comprises a first input terminal, a second input terminal, and an output terminal. The first input terminal of the AND gate AN1 is connected to the voltage detection circuit 208, the second input terminal of the AND gate AN1 is connected to the output terminal of the comparator C1. The trigger T1 comprises an input terminal, a first output terminal, and a second output terminal. The input terminal of the trigger T1 is connected to the output terminal of the AND gate AN1, the first output terminal of the trigger T1 is connected to the first switch Q1, and a second output terminal of the trigger T1 is connected to the third switch Q3.

In one embodiment, the trigger T1 is a D type trigger. An electrical level of the first output terminal of the trigger T1 is opposite to an electrical level of the input terminal of the trigger T1, and an electrical level of the second output terminal of the trigger T1 is the same as the electrical level of the input terminal of the trigger T1. In other embodiments, the trigger T1 can also be other triggers that already exist in current technology.

In one embodiment, the control circuit can also be a Micro Controller Unit (MCU), or a Single Chip Micyoco (SCM).

The first switch Q1 can comprise a control terminal, a first terminal, and a second terminal. The control terminal of the first switch Q1 is connected to the first output terminal of the trigger T1. The first terminal of the first switch Q1 is connected to a node between the voltage conversion circuit 202 and the power pin VCC of the first USB interface 204, and the second terminal of the first switch Q1 is connected to a node between the voltage detection circuit 208 and the first data pin D1 of the first USB interface 204. The second switch Q2 comprises a control terminal, a first terminal, and a second terminal. The control terminal of the second switch Q2 is connected to a node between the voltage detection circuit 208 and the first input terminal of the AND gate AN1. The first terminal of the second switch Q2 is connected to a node between the voltage detection circuit 208 and the first data pin D1 of the first USB interface 204, and the second terminal of the second switch Q2 is connected to the second data pin D2 of the first USB interface 204. The third switch Q3 comprises a control terminal, a first terminal, and a second terminal. The control terminal of the third switch Q3 is connected to the second output terminal of the trigger T1. The first terminal of the third switch Q3 is connected to a node between the second switch Q2 and the second data pin D2 of the first USB interface 204. The second terminal of the third switch Q3 is connected to a node between the sampling resistor R1 and the ground pin GND of the first USB interface 204.

In one embodiment, the first switch Q1 and the second switch Q2 can be a P type metal-oxide semiconductor field effect transistor (PMOSFET), or a pnp type transistor. The third switch can be a N type metal-oxide semiconductor field effect transistor (NMOSFET), or a npn type transistor.

The voltage detection circuit 208 outputs a logic 0 signal in response to the DC voltage not existing at the first data pin D1 of the first USB interface 204. That is, the USB cable 30a is the universal USB cable. The first input terminal of the AND gate AN1 is in the logic 0, the output terminal of the AND gate AN1 is in the logic 0, the first output terminal of the trigger T1 is in a logic 1, and the second output terminal of the trigger T1 is in the logic 0. The first switch Q1 is turned off, the second switch Q2 is turned on and the third switch Q3 is turned off. Therefore, the power pin VCC of the first USB interface 204 is not connected to the first data pin D1 of the first USB interface 204, the first data pin D1 of the first USB interface 204 is connected to the second data pin D2 of the first USB interface 204, and the second data pin D2 of the first USB interface 204 is not connected to the ground pin GND of the first USB interface 204.

The voltage detection circuit 208 outputs a logic 1 signal in response to the DC voltage existing at the first data pin D1 of the first USB interface 204. That is, the USB cable 30a is the special USB cable. In a quick charging state, the current detection 206 detects the charging current of the device 40 being greater than 2 A, a voltage of the second end of the sampling resistor R1 is greater than the reference voltage Vref. The output terminal of the comparator C1 is in the logic 1, the first input terminal of the AND gate AN1 is in the logic 1, the output terminal of the AND gate AN1 is in the logic 1, the first output terminal of the trigger T1 is in the logic 0, and the second output terminal of the trigger T1 is in the logic 1. The first switch Q1 is turned on, the second switch Q2 is turned off and the third switch Q3 is turned on. Therefore, the power pin VCC of the first USB interface 204 is connected to the first data pin D1 of the first USB interface 204, the first data pin D1 of the first USB interface 204 is not connected to the second data pin D2 of the first USB interface 204. In addition, the second data pin D2 of the first USB interface 204 is connected to the ground pin GND of the first USB interface 204. The power pin VCC of the first USB interface 204 and the first data pin D1 of the first USB interface 204 transmit the parallel charging current, the second data pin D2 of the first USB interface 204 and the ground pin GND of the first USB interface 204 transmit the parallel charging current, and the charging current of the device 40 is greater than 2 A. In a trickle charging state, the device 40 is nearly charged, the charging current of the device 40 automatically decreased. When the charging current of the device 40 is not greater than 2 A, the output terminal of the comparator C1 is in the logic 0, the first input terminal of the AND gate AN1 is in the logic 1, the output terminal of the AND gate AN1 is in the logic 0, the first output terminal of the trigger T1 is in the logic 1, and the second output terminal of the trigger T1 is in the logic 0. The first switch Q1 is turned off, the second switch Q2 is turned off and the third switch Q3 is turned off. Therefore, the power pin VCC of the first USB interface 204 is not connected to the first data pin D1 of the first USB interface 204, the first data pin D1 of the first USB interface 204 is not connected to the second data pin D2 of the first USB interface 204, and the second data pin D2 of the first USB interface 204 is not connected to the ground pin GND of the first USB interface 204.

The foregoing disclosure of various embodiments has been presented for the purposes of illustration. It is not intended to be exhaustive or limited to the precise forms disclosed. Many variations and modifications of the embodiments described herein will be apparent to one of ordinary skill in the art in the light of the above disclosure. The embodiments described herein are not to be construed as limiting the following claims.

What is claimed is:

1. A universal serial bus (USB) adaptor comprising:
a voltage conversion circuit converting voltage signals output by an external power;
a USB interface comprising a power pin connected to the voltage conversion circuit, a first data pin, a second data pin, and a ground pin;
a current detection circuit connected to the voltage conversion circuit and the ground pin, the current detection circuit detecting a charging current of a device, and converting the charging current into a voltage to compare the charging current with a reference voltage to output a comparison signal;
a first switch connected to the current detection circuit, the power pin, and the first data pin, the first switch controlling a connection relationship between the power pin and the first data pin according to the comparison signal output by the current detection circuit;
a second switch connected to the current detection circuit, the first data pin, and the second data pin, the second switch controlling a connection relationship between the first data pin and the second data pin according to the comparison signal output by the current detection circuit; and
a third switch connected to the current detection circuit, the second data pin, and the ground pin, the third switch controlling a connection relationship between the second data pin and the ground pin according to the comparison signal output by the current detection circuit.

2. The USB adaptor of claim 1, wherein in response to the charging current of the device being greater than the reference voltage, the current detection circuit outputs a first comparison signal, the first switch controls the power pin connected to the first data pin according to the first comparison signal so that the power pin and the first data pin can transmit the charging current in parallel, the second switch controls the first data pin not connected to the second data pin according to the first comparison signal, and the third switch controls the second data pin connected to the ground pin according to the first comparison signal so that the second data pin and the ground pin can transmit the charging current in parallel.

3. The USB adaptor of claim 1, wherein in response to the charging current of the device not greater than the reference voltage, the current detection circuit outputs a second comparison signal, the first switch controls the power pin not connected to the first data pin according to the second comparison signal, the second switch controls the first data pin connected to the second data pin according to the second comparison signal, and the third switch controls the second data pin not connected to the ground pin according to the second comparison signal.

4. The USB adaptor of claim 1, further comprising a voltage detection circuit connected to the first data pin or the second data pin, the voltage detection circuit detects and determines whether a direct current (DC) voltage exists at the first data pin or the second data pin or not.

5. The USB adaptor of claim 4, wherein in response to the DC voltage existing at neither the first data pin nor the second data pin, the voltage detection circuit outputs a first control signal, the first switch controls the power pin not connected to the first data pin according to the first control signal, the second switch controls the first data pin connected to the second data pin according to the first control signal, and the third switch controls the second data pin not connected to the ground pin according to the first control signal.

6. The USB adaptor of claim 4, further comprising a control circuit connected to the current detection circuit, the voltage detection circuit, the first switch, and the third switch, wherein the voltage detection circuit outputs a second control signal in response to the DC voltage existing at either the first data pin or the second data pin, the current detection circuit outputs a first comparison signal in response to the charging current of the device being greater than the reference voltage, the control circuit outputs a third control signal according to the first comparison signal and the second control signal, the first switch controls the power pin connected to the first data pin according to the third control signal so that the power pin and the first data pin can transmit the charging current in parallel, the second switch controls the first data pin not connected to the second data pin according to the second control signal, and the third switch controls the second data pin connected to the ground pin according to the third control signal so that the second data pin and the ground pin can transmit the charging current in parallel.

7. The USB adaptor of claim 6, wherein the second switch is connected to the voltage detection circuit, the control circuit comprises:
- an AND gate comprising a first input terminal connected to the voltage detection circuit, a second input terminal connected to the current detection circuit, and an output terminal; and
- a trigger with an input terminal connected to the output terminal of the AND gate, a first output terminal connected to the first switch, and a second output terminal connected to the third switch.

8. The USB adaptor of claim 4, further comprising a control circuit connected to the current detection circuit, the voltage detection circuit, the first switch, and the third switch, wherein the voltage detection circuit outputs a second control signal in response to the DC voltage existing at either the first data pin or the second data pin, the current detection circuit outputs a second comparison signal in response to the charging current of the device not greater than the reference voltage, the control circuit outputs a fourth control signal according to the second comparison signal and the second control signal, the first switch controls the power pin not connected to the first data pin according to the fourth control signal, the second switch controls the first data pin not connected to the second data pin according to the second control signal, and the third switch controls the second data pin not connected to the ground pin according to the fourth control signal.

9. The USB adaptor of claim 8, wherein the second switch is connected to the voltage detection circuit, the control circuit comprises:
- an AND gate comprising a first input terminal connected to the voltage detection circuit, a second input terminal connected to the current detection circuit, and an output terminal; and
- a trigger with an input terminal connected to the output terminal of the AND gate, a first output terminal connected to the first switch, and a second output terminal connected to the third switch.

10. The USB adaptor of claim 1, wherein the current detection circuit comprises:
- a sampling resistor with a first end connected to the voltage conversion circuit, and a second end connected to the ground pin; and
- a comparator with a positive input terminal connected to a node between the sampling resistor and the ground pin, a negative input terminal receiving the reference voltage, and an output terminal connected to the first switch, the second switch, and the third switch.

\* \* \* \* \*